(12) United States Patent
Cederstrand

(10) Patent No.: US 10,174,817 B2
(45) Date of Patent: Jan. 8, 2019

(54) DEVICE FOR LOCKING A BELT AT PREDETERMINED BELT TENSION

(71) Applicant: FLSmidth A/S, Valby (DK)

(72) Inventor: Tommy Cederstrand, Roknas (SE)

(73) Assignee: FLSMIDTH A/S (DK)

( * ) Notice: Subject to any disclaimer, the term of this patent is extended or adjusted under 35 U.S.C. 154(b) by 240 days.

(21) Appl. No.: 15/313,619

(22) PCT Filed: Jun. 2, 2015

(86) PCT No.: PCT/SE2015/050641
§ 371 (c)(1),
(2) Date: Nov. 23, 2016

(87) PCT Pub. No.: WO2015/187085
PCT Pub. Date: Dec. 10, 2015

(65) Prior Publication Data
US 2018/0231107 A1 Aug. 16, 2018

(30) Foreign Application Priority Data

Jun. 5, 2014 (SE) ........................................ 1400286

(51) Int. Cl.
*F16H 7/08* (2006.01)
*F16H 7/14* (2006.01)

(52) U.S. Cl.
CPC ............ *F16H 7/0848* (2013.01); *F16H 7/14* (2013.01); *F16H 2007/0851* (2013.01); *F16H 2007/0853* (2013.01)

(58) Field of Classification Search
CPC .......... F16H 7/0848; F16H 2007/0851; F16H 2007/0853

(Continued)

(56) References Cited

U.S. PATENT DOCUMENTS 4,177,684 A * 12/1979 White .................... F16H 55/30
474/113
6,083,132 A * 7/2000 Walker .................. F16H 7/0848
474/101

(Continued)

OTHER PUBLICATIONS

International Search Report and Written Opinion dated Sep. 25, 2015, 9 pages.

*Primary Examiner* — William E Dondero
*Assistant Examiner* — Mark K Buse
(74) *Attorney, Agent, or Firm* — Jeffrey A. Sharp

(57) ABSTRACT

The invention relates to a device for locking at least one belt (10) at predetermined belt tension, which belt (10) is arranged at a machine arrangement (1) with belt drive. The machine arrangement comprises a stand (3) having legs (2) placed on a base (4). At least one driving pulley (5) and at least one driven pulley (6) are aligned relative to each other. The legs (2) being articulately attached to at least one of the stand (3) or the base (4), and at least two of the legs (2) comprises longitudinally adjustable tension legs (20), which each comprises a first tension leg part (21) having a wedge box (30) arranged to receive a wedge (31) having a grooved surface (32) and a second tension leg part (22) having a grooved surface (23) directed towards said wedge box (30). The first (21) and second (22) tension leg parts are adapted to lock in relation to each other by cooperation between the grooved surface (32) of the wedge (31) and the grooved surface (23) of the second tension leg part (22) when the wedge (31) is adapted to wedge in wedge box (30).

6 Claims, 3 Drawing Sheets

(58) Field of Classification Search
USPC .................................................. 474/113, 114
See application file for complete search history.

(56) References Cited

U.S. PATENT DOCUMENTS

| | | | |
|---|---|---|---|
| 6,244,981 B1 | 6/2001 | Simpson | |
| 2005/0032595 A1* | 2/2005 | Garbagnati | F16H 7/0848 |
| | | | 474/101 |
| 2010/0022339 A1* | 1/2010 | Barve | F16H 7/0836 |
| | | | 474/111 |
| 2011/0306450 A1* | 12/2011 | Chou | F16H 7/14 |
| | | | 474/114 |

\* cited by examiner

DEVICE FOR LOCKING A BELT AT PREDETERMINED BELT TENSION

FIELD OF THE INVENTION

The invention relates to a device for locking a belt at predetermined belt tension at a machine arrangement of the kind set out in the preamble of claim 1.

BACKGROUND OF THE INVENTION

At machines provided with belt drives with one or more V-belts/belts (in the description below termed belt) between a motor with or without transmission (in the description below termed engine/transmission) and a driven shaft/driven shafts (in the description below termed driven shaft) of a machine a tensioning device for tensioning the belt is used.

More particularly, the belt tension is normally adjusted by a force being applied between the engine/transmission having a driving pulley and a driven pulley of a machine, and at adequate belt tension the distance between the pulleys relative to each other is locked by a threaded locking device, for instance.

Today, the belt tension is adjusted at most belt drives by means of threaded elements, threaded rods and adjusting nuts, for instance, which are rotated when the belt tension is increase/decrease, whereupon the setting is fixed by a locking nut. For this adjustment a tool and a measuring instrument is needed to verify the belt tension every time the belt is change/adjusted.

A disadvantage, when threaded elements are used to obtain the belt tension, is that with this typically means at least two points of adjustments have to be adjusted. With this method, the alignment must be done with the instrument each time the belt tension is released. This is not always done in practice.

A further disadvantage is that after a period of time the threads are usually damaged due to corrosion and/or mechanically, which means that it is not possible to reduce/increase the tension of the belt without replacing the damaged threaded elements.

Replacement of threaded elements is an additional maintenance cost and in many cases this means a long downtime of the machine, and it is not unusual with loss of production as a result.

To minimize loss of production, it sometimes happens that the belt is replaced by tools in a non-proper way which may damage the belt and reduce the useful life of the belt. One way is to force the belt by a tool onto the pulleys by extending it too much so as to mount the belt onto the pulleys. Then there is a risk of losing the control of the belt tension and the alignment.

Wrong belt tension and non-aligned pulleys means that the belt drive runs with unnecessarily high energy consumption and poor efficiency and the useful life of the belt is shortened.

SUMMARY OF THE INVENTION

The purpose of the invention is to wholly or partly overcome the above-mentioned disadvantages, such as long downtime and loss of production, since with a device according to the invention it is possible to maintain the belt drive in a relatively short period of time and always with the belt tension correctly set, whereby the energy consumption and efficiency of operation is optimized and provides conditions for a normal life of the belt.

According to the invention, this object is achieved by a device for locking at least one belt at predetermined belt tension, which belt is arranged at a machine arrangement with belt drive, which machine arrangement comprises a stand having legs placed on a base, at least one driving pulley which is arranged on a drive shaft, and at least one driven pulley, which pulleys are aligned relative to each other, the legs being articulately attached to at least one of the stand or the base, characterized in that at least two of the legs comprises longitudinally adjustable tension legs, that each of the longitudinally adjustable tension leg comprises a first tension leg part having a wedge box arranged to receive a wedge having a grooved surface and a second tension leg part having a grooved surface directed towards said wedge box, that the first and second tension leg parts are adapted to lock in relation to each other by cooperation between the grooved surface of the wedge and the grooved surface of the second tension leg part when the wedge is adapted to wedge in wedge box.

Further features of the device according to the invention for locking the belt at a predetermined belt tension are indicated in the dependent claims.

BRIEF DESCRIPTION OF THE DRAWING

The invention is described in more detail below in the form of a non-limiting example with reference to the accompanying drawing, on which

DETAILED DESCRIPTION OF PREFERRED EMBODIMENT

At the first assembly of the device according to the invention the pulleys are aligned between the motor/transmission and the driven shaft by means of measurement equipment (not shown). This setting is made with slack belt which means that the motor and shafts are aligned without bending stresses and deformations.

Figure 1:
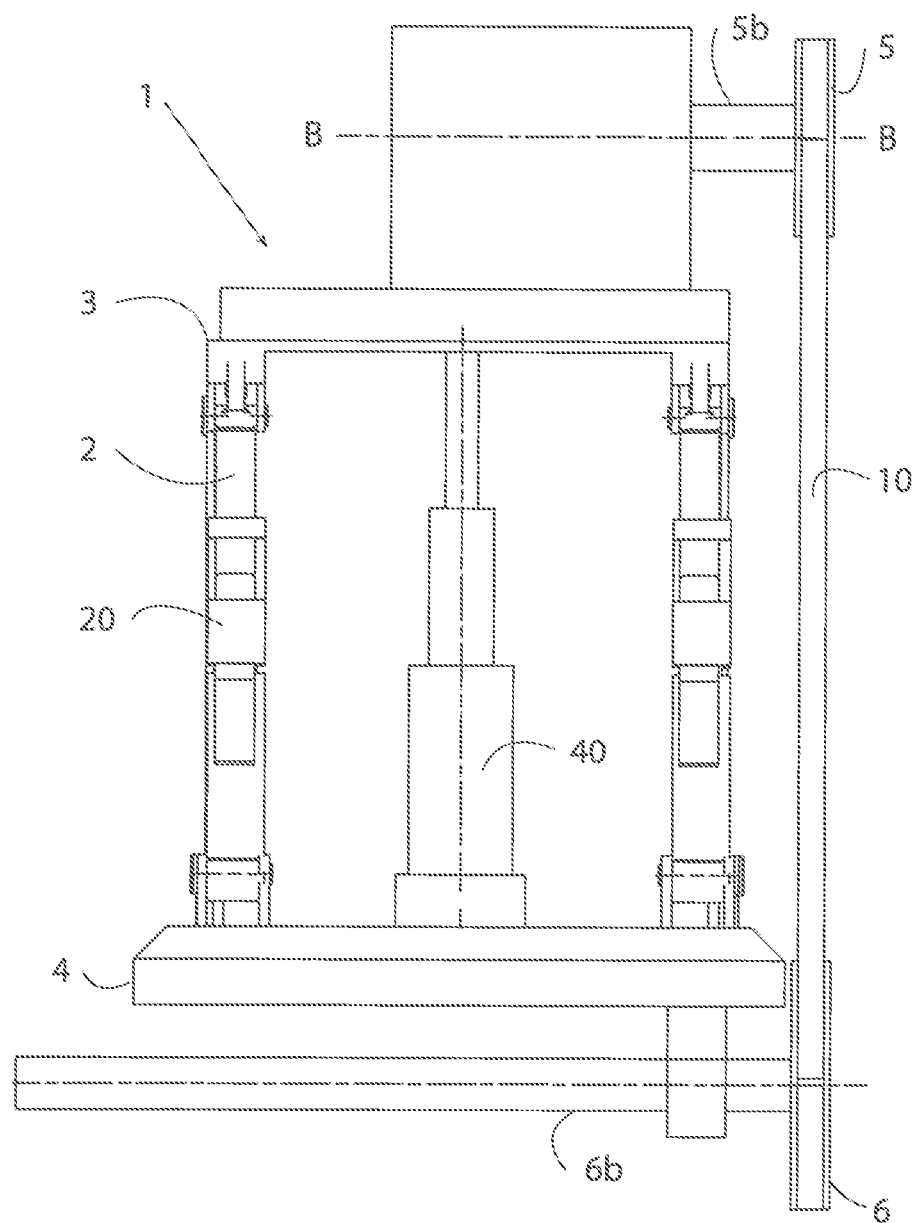
FIG. 1 is a side view of a machine arrangement with belt drive, comprising a device according of the invention for locking at least one belt at predetermined belt tension, the machine arrangement comprising a stand having legs disposed on a base, wherein at least one drying pulley and at least one driven pulley are aligned relative to each other.

A machine arrangement 1 belt drive according FIG. 1 comprises a stand 3 having legs 2, said stand with its legs is placed on a base 4. In the illustrated embodiment, a motor/transmission with a driving pulley 5 arranged on a drive shaft 5b placed on the stand and a driven shaft 6b with driven pulley 6 is placed on the base, but it is obvious that the engine/transmission with driving pulley 5 and the driven shaft 6b with the driven pulley 6 can be placed vice versa. The driving pulley 5 and the driven pulley 6 are aligned relative to each other. It is noted that in an embodiment not shown one or more belts 10 may run over more than two pulleys.

Figures 2, 3:
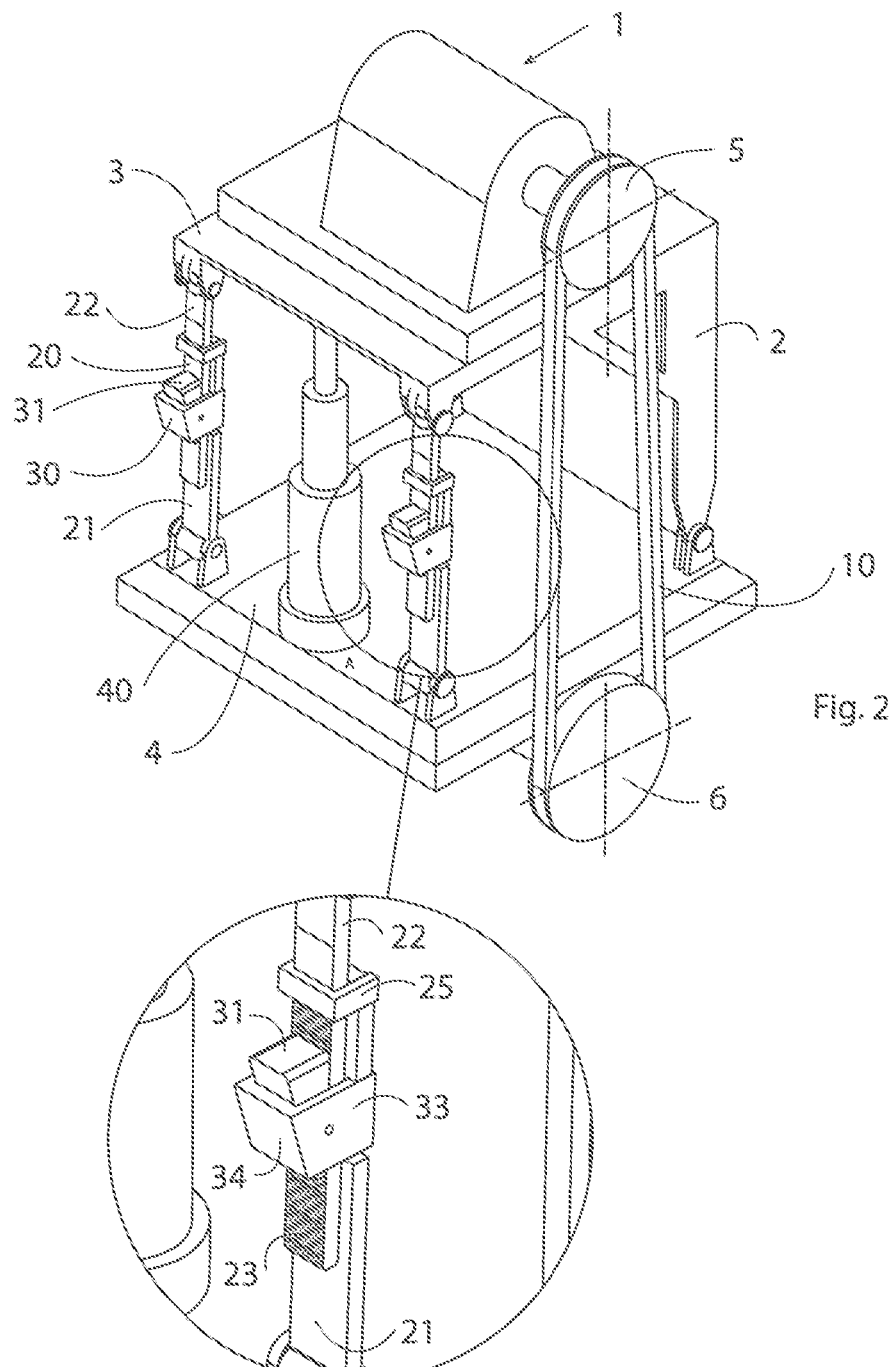
FIG. 2 is a view obliquely from above of the machine arrangement of FIG. 1.
FIG. 3 is an enlarged view of the portion within the circle designated A in FIG. 2 of a tension leg included in the device according to the invention for locking the belt at a predetermined belt tension.
Figure 4:
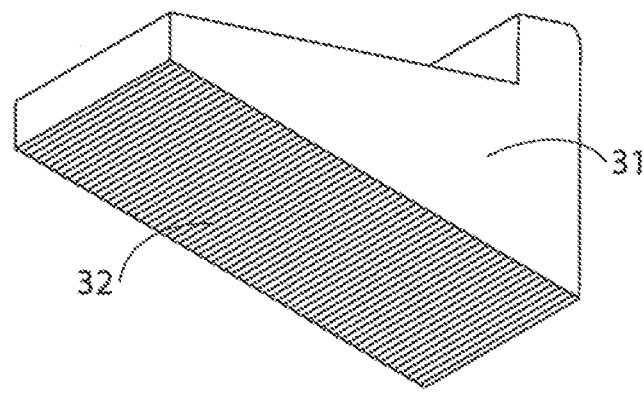
FIG. 4 is a perspective view of a wedge forming part of the device for locking a belt in FIG. 3.
Figure 5:
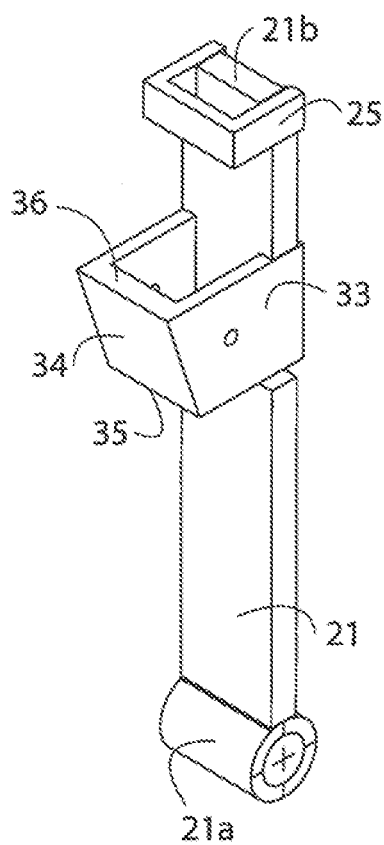
FIG. 5 shows a first tension leg part included in a tension leg disposed between the stand and the base.
Figure 6:
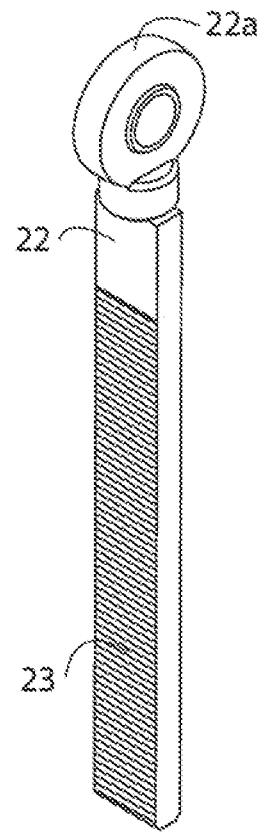
FIG. 6 shows a second tension leg part included in a tension leg disposed between the stand and the base.

As shown in FIG. 2, the frame 3 in the embodiment shown is provided with four legs 2 extending between the stand and the base. The legs 2 are preferably pivotally attached to at least one of the stand or the base. The drive shaft 5b of the engine/transmission has an axis B-B with the same longitudinal direction as the longitudinal direction of the driven shaft 6b. The legs 2, which are placed perpendicular to the longitudinal direction of said axis B-B and on the same side of the stand, are formed of longitudinally adjustable tension legs 20, each longitudinally adjustable tension leg comprising a first 21 and a second 22 tension leg part. More particularly, a first end 21a of the first tension leg part 21 is pivotally attached to the base 4, and a first end 22a of the second tension leg part 22 is pivotally attached to the stand 3.

The first tension leg part 21 extending from the base towards the stand is provided with a wedge box 30 adapted to receive a wedge 31 having a grooved surface 32. The second tension leg part 22 extending from the stand towards the base is provided with a grooved surface 23, wherein the grooves of the surfaces 23, 32 have complementary shape. The second tension leg part 22 is slidably disposed in and through the wedge box 30.

From FIG. 3 it can be inferred that the first 21 and second 22 tension leg parts are arranged to slide along each other and in the longitudinal direction thereof for tensioning/slacking the belt 10. In order to lock the first 21 and second 22 tension leg parts relative to each other in a fixed and repeatably position, the wedge box 30 is fixedly attached to the first tension leg part 21 and directed towards said side of said tension leg part against which the second tension leg part abuts. The wedge box 30 is formed of two parallel tongues 33 extending perpendicularly to the longitudinal direction of the first tension leg part and a crosspiece 34 connecting the parallel tongues 33 so that the wedge box 30 forms a wedge enclosing means. The crosspiece 34 is angled relative to the longitudinal direction of the two tension leg parts so that the distance at a first end 35 of the crosspiece directed towards the base between said first end and the second tension leg part 22 is shorter than a distance at a second end 36 of the crosspiece directed towards the stand between said second end and the second tension leg part 22.

The first tension leg part 21 is at a second end 21b, which is directed towards the stand 3, preferably provided with a cramp 25, through which the second tension leg part 22 is, with a clearance fit, slidably disposed so as to improve the lateral stability of the tension leg 20.

Mounting and Applying Tension

The following describes the mounting of a belt 10 to the machine arrangement 1 and applying belt tension. The belt 10 is mounted in slacked state on the pulleys 5,6, after which a jack 40 or any other suitable tensioning device is placed in position between the stand 3 and the base 4 so as to apply a force so that the belt 10 is tensioned to the desired tension. Thereafter, the wedge 31 is placed in the wedge box 30 of the respective tension leg 20 with its grooved surface 32 toward the grooved surface 23 of the second tension leg part 22 so that said surfaces abut against each other. Then the jack 40 is released and the desired belt tension is obtained and is automatically locked by the wedge being wedged in the wedge box, the first 21 and second 22 tension leg parts being locked in relation to each other by the grooved wedge surface of the wedge cooperating with the grooved surface of the second tension leg part. The wedge will abut against on one hand the crosspiece 34 and on the other hand the grooved surface 23.

Locking takes place through the dead weight of the machine arrangement 1 and the tension of the belt 10, or only by the tension of the belt, optionally in combination with the friction between constituent parts, i.e. the wedge/wedge box/tension leg part with and without wedge box.

Slacking of Belt Tension

When slacking the tension of the belt the jack 40 is placed in position and force is applied between the stand 3 and the base 4, whereupon the inventive friction locking is neutralized, i.e. wedge action between the grooved surface 32 of the wedge 31 and the grooved surface of the second tension leg part 22 stops. More specifically, by the applied force, the both tension leg parts of respective tension leg 20 will be displaced relative to each other, i.e. tension legs 20 are extended, whereby the wedge 31 may be removed, in the embodiment shown lifted slightly from its wedging position. The wedge can then easily be lifted/removed and the mechanical locking is non-existing. Then, the jack 40 is lowered and the belt 10 is slacked to the position where it can be easily removed.

By the device according to the invention it is possible to obtain a repeatable accuracy of the belt tension and the alignment between the engine/transmission and the driven shaft during maintenance.

Although, in the illustrated embodiment, the longitudinally adjustable tension legs 20 is provided vertically at a machine arrangement of the type shown, it is obvious to those skilled in the art that the legs can be arranged horizontally at a different type of machine arrangement. In this case, the locking by the wedge 31 is achieved only by the tension of the belt 10, optionally in combination with the friction between constituent parts, i.e. wedge/wedge box/tension leg part with and without wedge box.

It is further apparent to those skilled in the art that the belt in the above description and figures can be a multi-groove belt or a toothed belt, for instance.

The invention claimed is:

1. A device for locking at least one belt (10) at predetermined belt tension, the at least one belt (10) being arranged at a machine arrangement (1) having a belt drive, the machine arrangement (1) comprising a stand (3) having legs (2) placed on a base (4), at least one driving pulley (5) which is arranged on a drive shaft (5b), and at least one driven pulley (6), the at least one driving pulley (5) and the at least one driven pulley (6) being aligned relative to each other, the legs (2) being articulately attached to at least one of the stand (3) or the base (4), wherein at least two of the legs (2) comprise longitudinally adjustable tension legs (20), each of the longitudinally adjustable tension legs (20) comprising a first tension leg part (21) and a second tension leg part (22); the first tension leg part (21) having a wedge box (30) arranged to receive a wedge (31); the wedge (31) having a grooved surface (32) and the second tension leg part (22) having a grooved surface (23) directed towards the grooved surface (32) of the wedge box (30), such that the first (21) and second (22) tension leg parts are adapted to lock in relation to each other by cooperation between the grooved surface (32) of the wedge (31) and the grooved surface (23) of the second tension leg part (22) when the wedge (31) is wedged in the wedge box (30).

2. The device according to claim 1, wherein the longitudinally adjustable tensioning legs (20) are disposed perpendicular to a longitudinal direction (B-B) of the drive axle (5b) and on the same side of the stand (3).

3. The device according to claim 1, wherein the first tension leg part (21) and the second tension leg part (22) are adapted to lock in relation to each other by the wedge (31) being adapted to wedge in wedge box (30) by the dead weight of the machine arrangement (1) in combination with the tension from the belt (10), the second tension leg part (22) being adapted to by means of its the grooved surface (23) press the wedge (31) against wedge box (30) so that the second tension leg part (22) locks against the wedge (31).

4. The device according to claim 1, wherein the wedge (31) and the second tension leg part (22) are arranged to lock mechanically to each other via cooperation between the grooved surface (32) of the wedge (31) and the grooved surface (23) of the second tension leg part (22) and friction between the wedge (31), wedge box (30), and the first and second tension leg parts (21,22).

5. The device according to claim 1, wherein a second end (21*b*) of the first tension leg part (21) is provided with a cramp (25) through which the second tension leg part (22) is passed.

6. The device according to claim 1, wherein a first end (21*a*) of the first tension leg part (21) is pivotally attached to the base (4), and that a first end (22*a*) of the second tension leg part (22) is pivotally attached to the frame (3).

\* \* \* \* \*